US008694200B2

(12) United States Patent (10) Patent No.: US 8,694,200 B2
Tauchi et al. (45) Date of Patent: *Apr. 8, 2014

(54) APPARATUS AND METHOD FOR ADVICE PROVISION AND DRIVING CONDITION DIAGNOSIS

(75) Inventors: Nobutaka Tauchi, Toyoake (JP);
Kousuke Yamaoka, Kariya (JP);
Shojiro Takeuchi, Tokyo (JP)

(73) Assignees: DENSO CORPORATION, Kariya (JP);
Toyota Jidosha Kabushiki Kaisha, Toyota (JP)

( * ) Notice: Subject to any disclaimer, the term of this patent is extended or adjusted under 35 U.S.C. 154(b) by 947 days.

This patent is subject to a terminal disclaimer.

(21) Appl. No.: 12/533,142

(22) Filed: Jul. 31, 2009

(65) Prior Publication Data

US 2010/0030420 A1 Feb. 4, 2010

(30) Foreign Application Priority Data

Aug. 1, 2008 (JP) ................................. 2008-200004

(51) Int. Cl.
*G01M 17/00* (2006.01)
*G06F 7/00* (2006.01)
*G06F 19/00* (2011.01)

(52) U.S. Cl.
USPC ......................... 701/32.5; 701/29.1; 701/32.1

(58) Field of Classification Search
USPC ......... 701/29, 414, 423, 117, 21.9, 29.1–34.4
See application file for complete search history.

(56) References Cited

U.S. PATENT DOCUMENTS

| 4,004,269 A | | 1/1977 | Arai et al. |
| 4,058,796 A | * | 11/1977 | Oishi et al. .................... 340/459 |
| 4,249,242 A | * | 2/1981 | Fleurier ........................ 701/123 |
| 4,348,663 A | | 9/1982 | Yanagishima et al. |
| 4,454,497 A | | 6/1984 | Morse |
| 4,845,630 A | * | 7/1989 | Stephens ....................... 701/123 |
| 4,884,054 A | | 11/1989 | Moon, Sr. |
| 4,987,541 A | * | 1/1991 | Levente et al. ............... 701/32.5 |
| 5,311,430 A | | 5/1994 | Ishigami |
| 5,483,446 A | * | 1/1996 | Momose et al. .................. 701/1 |
| 5,546,305 A | | 8/1996 | Kondo |
| 5,693,876 A | * | 12/1997 | Ghitea et al. ............... 73/114.53 |

(Continued)

FOREIGN PATENT DOCUMENTS

| JP | 10-203197 A | 8/1998 |
| JP | A-10-288942 | 10/1998 |

(Continued)

OTHER PUBLICATIONS

U.S. Appl. No. 12/533,189, filed Jul. 31, 2009, Yamaoka et al.

(Continued)

*Primary Examiner* — Tien Dinh
*Assistant Examiner* — Michael A Fabula
(74) *Attorney, Agent, or Firm* — Posz Law Group, PLC

(57) ABSTRACT

An advice provision apparatus calculates the driving condition of the vehicle for every predetermined travel section, for the purpose of comparison with the driving condition in the previous travel section. The driving condition of the current section is evaluated in a relative manner based on the comparison of at least two travel sections, even when the absolute assessment of the driving condition is difficult. Thus, the advice provision apparatus can accurately and precisely diagnose the driving condition of the driver.

10 Claims, 8 Drawing Sheets

(56) References Cited

U.S. PATENT DOCUMENTS

| | | | |
|---|---|---|---|
| 5,913,917 A * | 6/1999 | Murphy | 701/123 |
| 6,052,644 A * | 4/2000 | Murakami et al. | 701/93 |
| 6,092,021 A * | 7/2000 | Ehlbeck et al. | 701/123 |
| 6,275,231 B1 | 8/2001 | Obradovich | |
| 6,289,332 B2 * | 9/2001 | Menig et al. | 180/167 |
| 6,415,224 B1 * | 7/2002 | Wako et al. | 701/409 |
| 6,453,731 B1 * | 9/2002 | Yaegashi | 73/114.52 |
| 6,542,077 B2 | 4/2003 | Joao | |
| 6,542,794 B2 | 4/2003 | Obradovich | |
| 6,577,927 B2 | 6/2003 | Shimazu | |
| 6,957,142 B2 * | 10/2005 | Entenmann | 701/117 |
| 6,990,407 B1 | 1/2006 | Mbekeani et al. | |
| 7,565,230 B2 * | 7/2009 | Gardner et al. | 701/32.7 |
| 7,765,058 B2 * | 7/2010 | Doering | 701/123 |
| 7,865,276 B2 * | 1/2011 | Skaff et al. | 701/22 |
| 7,996,125 B2 * | 8/2011 | Skaff et al. | 701/22 |
| 8,063,755 B2 * | 11/2011 | Eikelenberg et al. | 340/439 |
| 8,165,782 B2 * | 4/2012 | Jeong | 701/104 |
| 8,228,180 B2 * | 7/2012 | Levy et al. | 340/439 |
| 8,296,048 B2 * | 10/2012 | Henderson et al. | 701/123 |
| 2002/0091473 A1 * | 7/2002 | Gardner et al. | 701/35 |
| 2002/0120371 A1 * | 8/2002 | Leivian et al. | 701/1 |
| 2002/0120374 A1 * | 8/2002 | Douros et al. | 701/29 |
| 2002/0121969 A1 | 9/2002 | Joao | |
| 2003/0060977 A1 * | 3/2003 | Jijina et al. | 701/210 |
| 2003/0069683 A1 * | 4/2003 | Lapidot et al. | 701/117 |
| 2003/0191566 A1 * | 10/2003 | Ben-Assa | 701/29 |
| 2004/0030458 A1 * | 2/2004 | Entenmann | 701/1 |
| 2004/0064337 A1 | 4/2004 | Nakahara et al. | |
| 2005/0125117 A1 | 6/2005 | Breed | |
| 2005/0159870 A1 | 7/2005 | Tohdo et al. | |
| 2005/0209771 A1 | 9/2005 | Ishiguro | |
| 2006/0235615 A1 * | 10/2006 | Kato et al. | 701/300 |
| 2007/0256481 A1 * | 11/2007 | Nishiyama et al. | 73/113 |
| 2008/0100475 A1 | 5/2008 | Horstemeyer | |
| 2008/0120175 A1 * | 5/2008 | Doering | 705/14 |
| 2009/0091439 A1 | 4/2009 | Sekiyama et al. | |
| 2009/0105897 A1 * | 4/2009 | Breslau et al. | 701/29 |
| 2010/0026476 A1 * | 2/2010 | Yamaoka et al. | 340/439 |
| 2010/0274435 A1 * | 10/2010 | Kondoh et al. | 701/29 |
| 2011/0140874 A1 * | 6/2011 | Tauchi et al. | 340/438 |
| 2011/0148618 A1 * | 6/2011 | Harumoto et al. | 340/450 |
| 2012/0065874 A1 * | 3/2012 | Sato et al. | 701/123 |
| 2012/0191334 A1 * | 7/2012 | Kashio et al. | 701/123 |

FOREIGN PATENT DOCUMENTS

| | | | | |
|---|---|---|---|---|
| JP | 11-272996 A | 10/1999 | | |
| JP | A-2000-247162 | 9/2000 | | |
| JP | A-2001-74764 | 3/2001 | | |
| JP | A-2004-234418 | 8/2004 | | |
| JP | A-2004-251786 | 9/2004 | | |
| JP | 2004-301546 A | 10/2004 | | |
| JP | A-2004-325851 | 11/2004 | | |
| JP | 2005-009991 A | 1/2005 | | |
| JP | A-2006-88820 | 4/2006 | | |
| JP | 2006-209455 A | 8/2006 | | |
| JP | A-2006-209455 | 8/2006 | | |
| JP | A-2006-243856 | 9/2006 | | |
| JP | A-2006-275869 | 10/2006 | | |
| JP | 2007-284049 A | 11/2007 | | |
| JP | 2010-038647 A | 2/2010 | | |
| WO | WO 00/07150 A1 | 2/2000 | | |
| WO | WO 2006054971 | * | 5/2006 | G01N 21/00 |
| WO | WO 2008026900 A1 | * | 3/2008 | G07C 5/08 |
| WO | WO 2010101 3826 A1 | 2/2010 | | |

OTHER PUBLICATIONS

International Search Report and Written Opinion of the International Searching Authority mailed on Sep. 15, 2009 for the corresponding International patent application No. PCT/JP2009/063711 in related U.S. Appl. No. 13/002,054.

International Preliminary Report on Patentability dated Nov. 2, 2010 for the corresponding International patent application No. PCT/JP2009/063711 in related U.S. Appl. No. 13/002,054.

Office Action dated Oct. 16, 2012 issued in corresponding JP patent application No. 2008-200005 (and English translation) in related U.S. Appl. No. 13/002,054.

Office Action dated Jan. 24, 2013 issued in corresponding DE patent application No. 11 2009 001 876.9 (English translation) in related U.S. Appl. No. 13/002,054.

Office Action dated Mar. 13, 2013 issued in corresponding CN patent application No. 200980128349.0 (English translation) in related U.S. Appl. No. 13/002,054.

Office Action dated Jan. 18, 2013 issued by the United States Patent Office in related U.S. Appl. No. 13/002,054.

Office Action dated Apr. 3, 2013 issued in corresponding CN patent application No. 2009101650947 (and English translation).

Office Action dated Jun. 28, 2013 issued by the United States Patent Office in related U.S. Appl. No. 13/002,054.

* cited by examiner

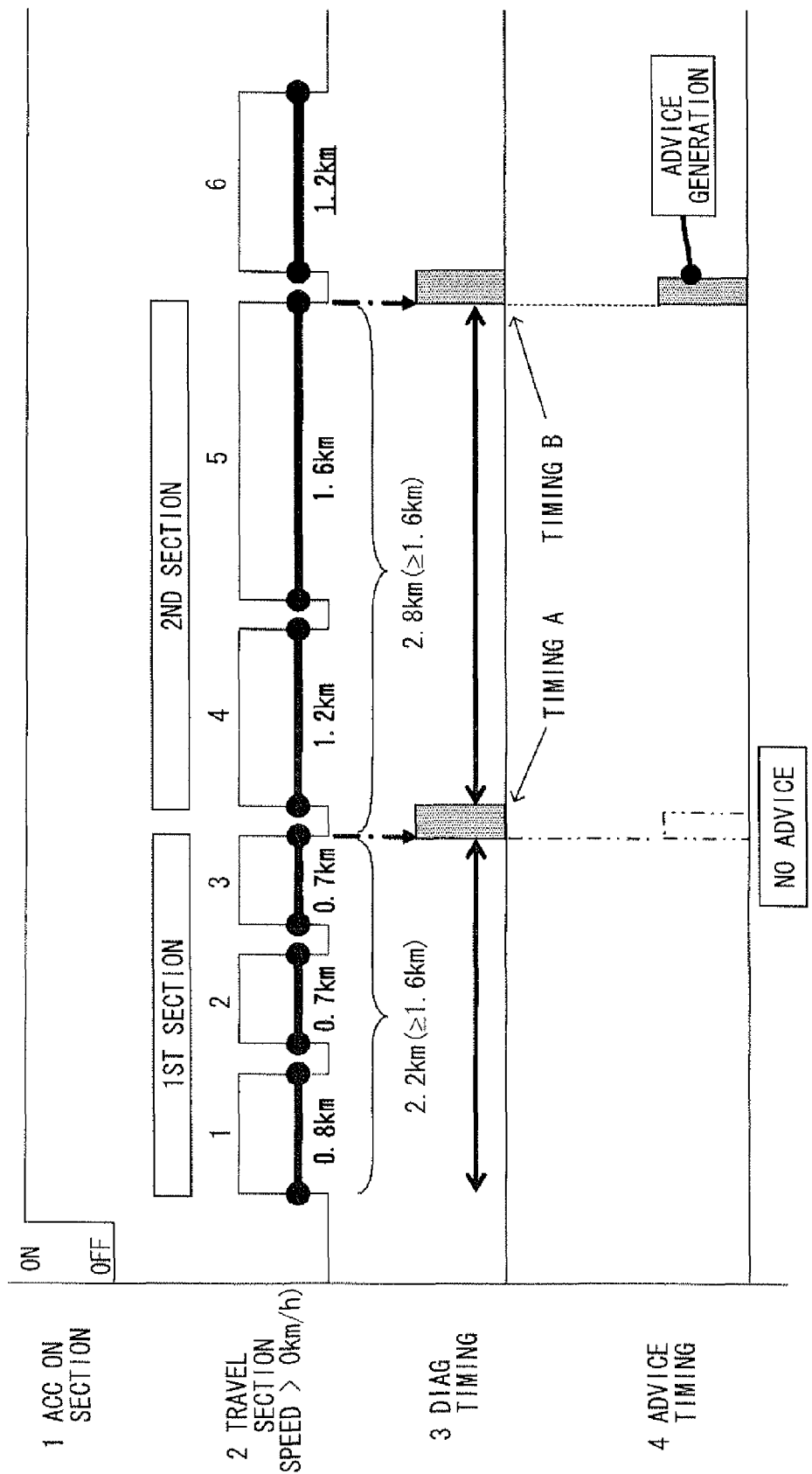

FIG. 4

| | |
|---|---|
| ECO SW USE RATE | ECO SW USE TRAVEL DISTANCE (n) − ECO SW USE TRAVEL DISTANCE (n−1) / TRAVEL DISTANCE (n) − TRAVEL DISTANCE (n−1) |
| ECO LAMP LIT RATE | ECO LAMP DISTANCE (n) − ECO LAMP DISTANCE (n−1) / DIAG TRAVEL DISTANCE (n) − DIAG TRAVEL DISTANCE (n−1) |
| MIS-GEARED RATE | MIS-GEARED DISTANCE (n) − MIS-GEARED DISTANCE (n−1) / TRAVEL DISTANCE (n) − TRAVEL DISTANCE (n−1) |
| MODE SELECTION RATE | MODE-SELECTED DISTANCE (n) − MODE-SELECTED DISTANCE (n−1) / TRAVEL DISTANCE (n) − TRAVEL DISTANCE (n−1) |
| OVER-ACCEL RATE | OVER-ACCELED DISTANCE (n) − OVER-ACCELED DISTANCE (n−1) / TRAVEL DISTANCE (n) − TRAVEL DISTANCE (n−1) | n: CURRENT SECTION
n−1: PREV SECTION
*EACH ELEMENT IS CUMULATIVE DISTANCE

FIG. 5

| ENGINE TYPE | X | Z |
|---|---|---|
| TRANSMISSION | CVT | CVT |
| SPEED: 0km/h<br>MAX ACCEL TH(%) | 2<br>4 | 2<br>4 |
| SPEED: 5km/h<br>MAX ACCEL TH(%) | 2<br>4 | 2<br>4 |
| SPEED: 10km/h<br>MAX ACCEL TH(%) | 2<br>4 | 2<br>4 |
| SPEED: 20km/h<br>MAX ACCEL TH(%) | 2<br>3 | 2<br>3 |
| SPEED: 30km/h<br>MAX ACCEL TH(%) | 2<br>2 | 2<br>2 |
| SPEED: 40km/h<br>MAX ACCEL TH(%) | 2<br>2 | 2<br>2 |
| SPEED: 50km/h<br>MAX ACCEL TH(%) | 23 | 23 |
| SPEED: 60km/h<br>MAX ACCEL TH(%) | 24 | 24 |
| SPEED: 70km/h<br>MAX ACCEL TH(%) | 25 | 25 |
| SPEED: 80km/h<br>MAX ACCEL TH(%) | 27 | 27 |
| SPEED: 90km/h<br>MAX ACCEL TH(%) | 29 | 29 |
| SPEED: 100km/h<br>MAX ACCEL TH(%) | 31 | 31 |
| SPEED: 110km/h<br>MAX ACCEL TH(%) | 33 | 33 |

FIG. 7

| | |
|---|---|
| USER NAME : GUEST DRIVER | REAL TIME DIAG |
| ● STATUS / RANK | ● ACCUM PT |
| Blue / 1 | 1,500 Pt |
| ● ECO LEVEL | ● UPDATED |
| Excellent | 2008/7/30 13:45 |
| ● FUEL MILE | |
| 10.2 Km/L | |
| ● ADVICE | |
| PREV    SLOWER ACCELERATION WILL IMPROVE ··· | NEXT |

US 8,694,200 B2

APPARATUS AND METHOD FOR ADVICE PROVISION AND DRIVING CONDITION DIAGNOSIS

CROSS REFERENCE TO RELATED APPLICATION

The present application is based on and claims the benefit of priority of Japanese Patent Application No. 2008-200004, filed on Aug. 1, 2008, the disclosure of which is incorporated herein by reference.

FIELD OF THE INVENTION

The present disclosure generally relates to an advice provision apparatus and a driving condition diagnosis system for advice provision for the driver of a vehicle based on a diagnosis of driving conditions.

BACKGROUND INFORMATION

In recent years, environment-related situations have developed serious problems such as an environmental pollution and a global warming. In the automotive sectors, the reduction of emission gas including carbon dioxide is a matter of growing concern.

Further, safety issues are considered to have importance under the current situation of traffic accidents and the like.

One approach to the above problems is that the vehicle is equipped with more intelligent and sophisticated functions intended to improve the current standard of environment-friendly and safer performance of the vehicle. This approach has been implemented after the awareness to those problems and concerns, and has yielded a certain outcome.

The other approach to the above problems is that the drivers are trained to have improved efficiency in terms of driving the vehicle on a lower fuel consumption rate, with improved safety-related driving skills. Therefore, ideas for the improvement of the driving skills of individual drivers have been proposed, which includes, for example, an apparatus for diagnosing driving conditions of the driver while he/she is sitting behind the wheel.

For example, an apparatus disclosed in Japanese patent document JP-A-2000-247162 notifies the driver of diagnosis and evaluation results on multiple diagnosis items based on the detection of the driving conditions and comparison of the detected conditions with standard values.

However, in terms of diagnosis/evaluation accuracy of the driving conditions, some diagnosis items can hardly be diagnosed appropriately in a quantitative manner (i.e., an absolute assessment).

For example, the fuel mileage smaller than a certain standard value in a specific section does not necessarily means that the driving condition in that section is better than the other sections. That is, in other words, the smaller fuel mileage in an expressway, which is usually smaller than the fuel mileage in a local road, should not automatically be diagnosed that the vehicle is in a good driving condition, if, for example, the fuel mileage is not smaller than the average fuel mileage calculated from daily travels of the same expressway section due to over-acceleration or the like. In that case, the driving conditions in the target section may better be diagnosed negatively.

SUMMARY OF THE INVENTION

In view of the above and other problems, the present invention provides a driving advice provision apparatus that yields an appropriately accurate diagnosis in a course of advice provision based on the diagnosis of driving conditions.

In an aspect of the present disclosure, the driving advice provision apparatus includes: a vehicle information acquisition unit for acquiring vehicle information that represents a condition of a vehicle; a diagnosis unit for diagnosing a driving condition of the vehicle based on the vehicle information acquired by the vehicle information acquisition unit; an advice generation unit for generating an advice to be provided for a driver of the vehicle based on a diagnosis result by the driving diagnosis unit; and an advice notification unit for notifying the advice for the driver of the vehicle generated by the advice generation unit. The diagnosis unit of the driving advice provision apparatus diagnoses the driving condition of a target travel section by (a) calculating the driving condition of the vehicle for each of travel sections and (b) comparing the calculated driving condition of the target travel section with the calculated driving conditions of other travel sections.

In other words, if the driving condition in the target travel section is determined as worse in comparison to the driving condition in the other travel section, the driving condition in the target travel section may be diagnosed as being worsened. If, conversely, the driving condition in the target travel section is determined as better in comparison to the driving condition in the other travel section, the driving condition in the target travel section may be diagnosed as being better.

That is, the driving condition relatively worsened in the target section than the other section leads to the worsened diagnosis result, and the driving condition relatively improved in the target section than the other section leads to the better diagnosis result.

Due to the above-described operation scheme that employs evaluation in a relative manner, the diagnosis result of the driving advice provision apparatus in the scope of comparison range can be determined accurately.

In other aspect of the present disclosure, a driving condition diagnosis apparatus includes: a vehicle information acquisition unit for acquiring vehicle information that represents a condition of a vehicle; and a diagnosis unit for diagnosing a driving condition of the vehicle based on the vehicle information acquired by the vehicle information acquisition unit. The diagnosis unit of the driving condition diagnosis apparatus diagnoses the driving condition of a target travel section by (a) calculating the driving condition of the vehicle for each of travel sections and (b) comparing the calculated driving condition of the target travel section with the calculated driving conditions of other travel sections.

The driving condition diagnosis apparatus yields the same advantageous effects as the driving advice provision apparatus described above, due to the same operation scheme.

BRIEF DESCRIPTION OF THE DRAWINGS

Objects, features, and advantages of the present disclosure will become more apparent from the following detailed description made with reference to the accompanying drawings, in which:

FIG. 3 is a time chart of diagnosis timing of driving conditions and advice generation timing in the embodiment of the present disclosure;

FIG. 4 is a diagram of equations of diagnosis calculation in the embodiment of the present disclosure;

FIG. 5 is a diagram of information regarding a relation between vehicle speeds and thresholds of accelerator opening in the embodiment of the present disclosure;

FIG. 7 is an illustration of a screen displaying a diagnosis result of the driving condition in the embodiment of the present disclosure.

DETAILED DESCRIPTION

The present disclosure is described with reference to drawings.

Figure 1:
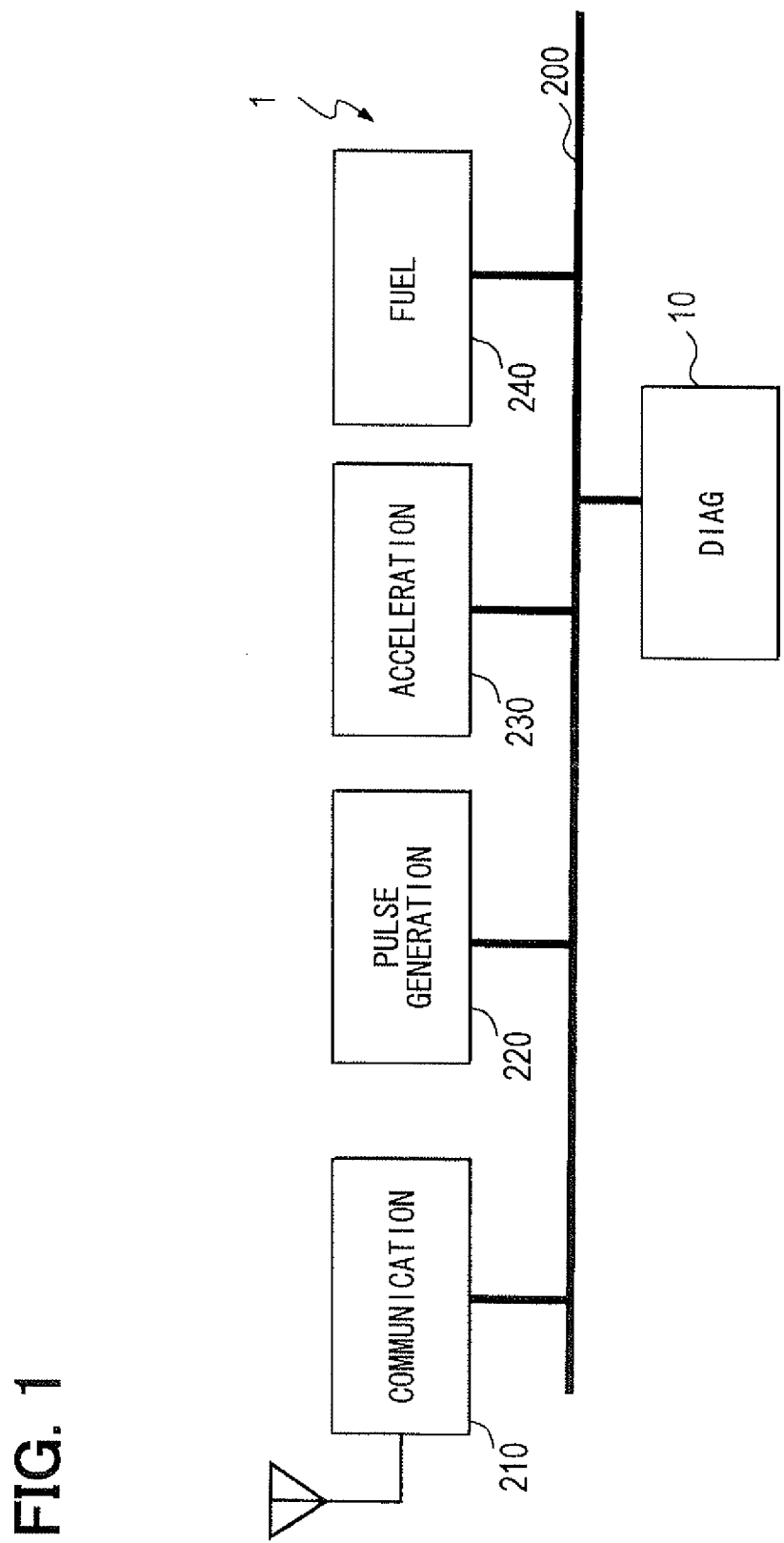
FIG. 1 is a block diagram of a driving diagnosis system having an advice provision apparatus in an embodiment of the present disclosure.

FIG. 1 is a block diagram of a driving diagnosis system 1 having an advice provision an advice provision apparatus 10 of the present disclosure.

The advice provision apparatus 10 is connected with a vehicle local area network 200. Further, the network 200 has other components such as, for example, a wide area communication unit 210, a speed pulse generator 220, an acceleration sensor 230 and a fuel quantity detection sensor 240 connected thereto. In other words, various sensors for detecting the condition of the vehicle are connected with to the vehicle local area network 200.

The wide area communication unit 210 receives information through a radio beacon, a light beacon or the like, and transmits information therethrough. The transmitted and received information includes, for example, traffic congestion information from VICS information service (Vehicle Information and Communication Service (Registered Trademark) implemented in Japan) together with other information such as vehicle information, user information and the like. The beacons are disposed along the road for reception and transmission of the information from the communication unit 210.

The speed pulse generator 220 generates a pulse signal according to the speed of the vehicle.

The acceleration sensor 230 outputs a signal according to the acceleration of the vehicle.

The fuel quantity detection sensor 240 outputs a signal according to the fuel quantity in the fuel tank.

Figure 2:
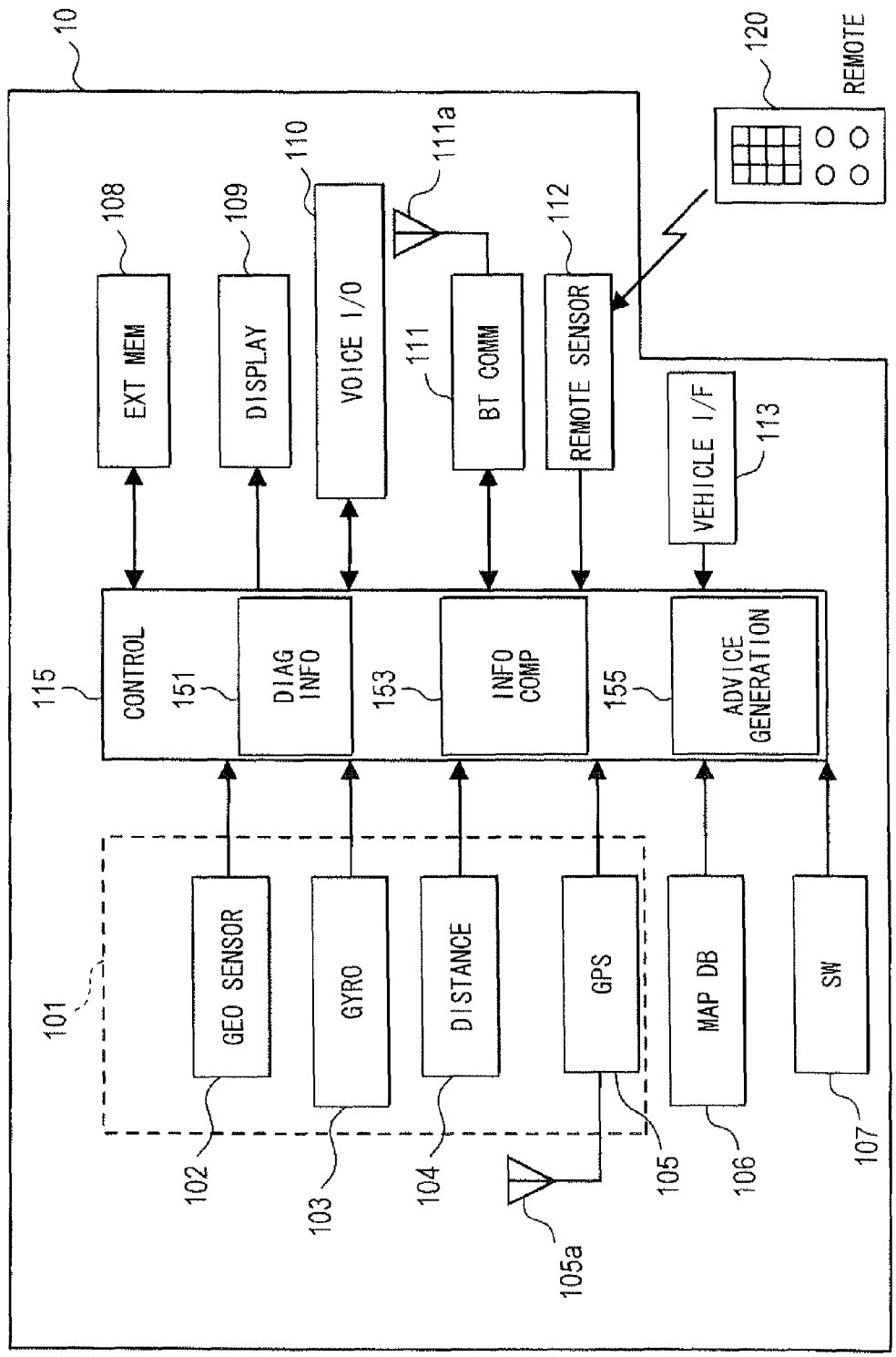
FIG. 2 is a detailed block diagram of the advice provision apparatus in the embodiment of the present disclosure.

FIG. 2 is a detailed block diagram of the advice provision apparatus 10. The advice provision apparatus 10 includes a position sensor 101, a map database 106, an operation switch group 107, an external memory 108, a display unit 109, a voice I/O unit 110, a Bluetooth communication unit (hereinafter designated as a BT unit) 111, a remote control sensor 112, a vehicle interface (hereinafter designated as a vehicle I/F) 113, and a the control circuit 115 which exerts total control of those components.

The position sensor 101 is a sensor group to detect the current position and the azimuth (the direction of movement) of the vehicle which has the advice provision apparatus 10, and is equipped with a geomagnetism sensor 102, a gyroscope 103, a distance sensor 104, and a GPS receiver 105.

The GPS receiver 105 receives a radio wave from GPS (Global Positioning System) satellites through a GPS antenna 105a, and detects the position, the azimuth (the direction of movement/travel), the speed of the vehicle and the like.

The geomagnetism sensor 102 is an azimuth sensor which uses a semiconductor, and detects geomagnetism of the earth in a north-south direction for determining the azimuth (the direction of movement). The gyroscope 103 is a sensor for detecting the angular speed (the azimuth variation) of the vehicle, and outputs a detection signal according to the angular speed of the rotating motion of the vehicle.

The distance sensor 104 detects a travel distance based on the acceleration in the front-rear direction of the vehicle and other information.

The errors of the above sensors with respectively different nature are compensated with each other, in order to achieve the sufficient detection accuracy.

The map database 106 stores map data. The map data includes link data which represents a road, node data which represents an intersection, and so-called mapping matching to improve the precision of a specified position, as well as mark data representing facilities, image data for displaying navigation screen, voice data for providing voice guidance.

The operation switch group 107 is an input operation panel that is integrally formed with the display unit 109, having a touch panel on the display screen together with mechanical button type switches arranged around the screen. The touch panel and the display unit 109 are arranged in a layered manner, and the various methods of sensing the touch such as a pressure sensing method, an electric-induction method, a capacitance method or a combination of those methods may be employed for the touch sensing method of the touch panel.

The external memory 108 stores various programs executed by the circuit 115 as well as a calculation result of the control circuit 115 and the like.

The display unit 109 uses a liquid crystal color display unit or the like for displaying the image of diagnosis results, a map, a searched route, a TV program, a DVD image and the like as well as displaying button images when the screen of the display unit 109 serves as a touch panel as a part of the operation switch group 107.

The voice I/O unit 110 provides a sound/voice guidance by outputting the sound/voice of the route guide, and converts user's voice from a microphone to electric signals for voice recognition and other purposes, that is, for outputting recognition results to the control circuit 115.

The BT unit 111 is a component to wirelessly communicate with peripheral equipment (based on a Bluetooth standard).

The remote control sensor 112 receives signals of radio wave and infrared rays from a remote controller 120 which is operated by the user, and inputs a reception result to the control circuit 115. The user is enabled, by operating the remote controller 120, to operate the apparatus 1 from a remote position in the same manner as he/she operates the operation switch group 107.

The vehicle I/F 113 receives signals from the various sensors in the vehicle (e.g., the speed pulse generator 220, the acceleration sensor 230, the fuel quantity detection sensor 240 and the like in FIG. 1) and inputs those signals to the control circuit 115. The vehicle may have other sensors such as, for example, an accelerator sensor, a throttle position sensor, a brake sensor, a steering angle sensor, an inter-vehicle distance sensor, an image sensor, a turn signal sensor, an illumination sensor and the like (not shown in the drawing).

The control circuit 115 is equipped with a driving diagnostic information generation unit 151, a diagnostic information comparison unit 153, and an advice generation unit 155.

The driving diagnostic information generation unit 151 receives signals, through the vehicle I/F 113, from the speed pulse generator 220, the acceleration sensor 230, the fuel quantity detection sensor 240, for example, that is, it acquires a vehicle condition, and then generates diagnostic information (i.e., a diagnosis result). Further, the driving diagnostic information generation unit 151 calculates an information acquisition time based on the time data included in the GPS signal from the GPS satellites. Furthermore, in the present embodiment, the driving diagnostic information generation unit 151 performs a driving condition diagnosis for a unit of travel section that has a predetermined travel distance. The details of the diagnosis are described later.

The diagnostic information comparison unit 153 compares diagnosis results from each of the travel sections. More specifically, it compares a diagnosis result of the previous travel section with a diagnosis result from a current travel section.

The advice generation unit 155 generates an advice to be provided for the driver of the vehicle, based on the diagnostic information generated by the driving diagnostic information generation unit 151 and/or a comparison result by the diagnostic information comparison unit 153.

FIG. 3 is a time chart which shows the diagnosis timing of the driving condition and the generation timing of the advice.

As for FIG. 3, the first row shows ON and OFF condition of the accessories switch (ACC) of the vehicle.

The second row shows travel and stop of the vehicle. That is, each of sections (1) to (6) shows a travel section of the vehicle with the vehicle speed greater than 0 km/h. The other portion of the chart represents stopping of the vehicle, with the vehicle speed equal to 0 km/h. The numbers in each of the section indicates a travel distance of the vehicle in each of those sections.

The third row shows the diagnosis timing of the driving condition. In the present embodiment, a diagnosis is performed for a unit section, or for an evaluation section. More practically, the travel of the vehicle is grasped by using the unit section, which is defined by a start point having a cumulative travel distance of 0 km and an end point where the vehicle stops for the first time after the cumulative travel distance exceeding 1.6 km. The threshold distance of 1.6 km is employed based on a statistics of a short travel, that is, a travel to a nearest store or the like.

In the example of FIG. 3, the spot where the vehicle starts the travel after turning on of the ACC switch (i.e., the start point of section (1)) is considered as a start point of the evaluation section. According to the rule set forth in the above description, the first stop at the cumulative distance of 0.8 km does not exceed the threshold of 1.6 km, thereby making the spot of the first stop (i.e., the end point of section (1)) not eligible as the end point of an evaluation section. Likewise, the end point of section (2) is not eligible for being an end point of an evaluation section, due to the cumulative travel distance of 1.5 km. The end point of section (3) with the cumulative travel distance of 2.2 km then satisfies the end point condition of the evaluation section, that is, exceeding the threshold of 1.6 km. In other words, the end point of section (3) is the first stop after exceeding the threshold of 1.6 km. Therefore, the first evaluation section starts at the start point of section (1), and ends at the end point of section (3). Thus, a diagnosis is performed for the first evaluation section. The diagnosis timing of the first evaluation section is set at the end point of the section (3). This diagnosis timing is designated as a timing A in FIG. 3.

The next evaluation section, that is, the second evaluation section, is then defined as a section starting at the end point of section (3) and ending at the end point of section (5). The diagnosis timing of the second evaluation section is set at the end point of section (5). The diagnosis timing of the second evaluation section is designated as a timing B.

The fourth row shows an advice generation timing (the execution timing of the advice generation processing). At the advice generation timing, a diagnosis result in the previous evaluation section and a diagnosis result in the current evaluation section are compared for a comparative evaluation of the current section, and an advice based on the comparative evaluation is generated. The details of the evaluation are described later with reference to FIG. 5. Therefore, at the end point of the first evaluation section, no advice is generated due to the non-existence of the previous evaluation section. In other words, at the end point of the second evaluation section, the diagnosis result of the first evaluation section and the diagnosis result of the second evaluation section are compared with each other, and the an advice is generated based on the comparative evaluation of the diagnosis result of the second evaluation section.

FIG. 4 is a diagram of diagnosis contents.

The diagram shows five diagnosis items, that is, an eco switch use rate, an eco lamp lit rate, a mis-geared rate, a mode selection rate, and an over-accel rate. For at least above five items, the diagnosis performed in the present embodiment. In this case, all of the five items are indices of environment and safety related diagnosis represented by a rate of cumulative travel distances.

A few comments on the above terms may help better understand the contents of the diagnosis. That is, the eco switch is a travel mode selection switch that turns on a low fuel consumption travel mode. In the low fuel consumption travel mode, the air-conditioner operation rate is suppressed relative to a normal mode, for example, or a fuel injection amount is decreased for the same stepping stroke of the acceleration pedal, for the purpose of yielding a lower fuel consumption rate. Further, the eco lamp is an indicator that is turned on when the vehicle is traveling in an economical traveling condition. The economical traveling condition may include the low fuel consumption condition.

Hereinafter, the details of each of the five diagnosis items are described. In the following description, the "cumulative" value indicates an accumulation of the subject value after turning on of the ACC switch. Further, the suffix (n) represents that the subject value is a value from the current diagnosis, and the suffix (n−1) indicates that the subject value is a value from the previous diagnosis.

⟨ Eco Switch Use Rate⟩

The eco switch (SW) use rate is a rate of travel distance with the eco switch turned on in a certain travel section or in a certain travel distance.

The equation for calculating the eco switch use rate is, (Eco SW use cumulative travel distance (n)−Eco SW use cumulative travel distance (n−1))/(Cumulative travel distance (n))−(Cumulative travel distance (n−1))    (Equation 1)

The eco switch use cumulative travel distance is a cumulative travel distance of the vehicle with the eco switch turned on (i.e., pressed-down).

The equation 1 is described with reference to the time chart in FIG. 3. In the example of FIG. 3, there is no previous evaluation section for the diagnosis timing A. Therefore, the diagnosis value of the previous evaluation section is set as 0, and the description is focused on the diagnosis timing B.

The numerator of the equation 1 is calculated by subtracting, from an eco switch use (i.e., turned-on) cumulative travel distance at the timing B, an eco switch use (i.e., turned-on) cumulative travel distance at the timing A. That is, in other words, the travel distance with the eco switch turned on in the second evaluation section is calculated as the numerator.

The denominator of the equation 1 is calculated by subtracting, from a cumulative travel distance at the timing B, a cumulative travel distance at the timing A. That is, in other words, the travel distance of 2.8 km in the second evaluation section is calculated as the denominator.

⟨ Eco Lamp Lit Rate ⟩

The eco lamp lit rate is a rate of travel distance with the eco lamp turned on in a certain travel section.

The equation for calculating the eco switch use rate is, $$\text{(Eco lamp cumulative travel distance (n)} - \text{Eco lamp cumulative travel distance (n}-1))/(\text{Eco lamp diag cumulative travel distance (n)}) - (\text{Eco lamp diag cumulative travel distance (n}-1)) \quad \text{(Equation 2)}$$

The eco lamp cumulative travel distance is a cumulative travel distance of the vehicle with the eco lamp turned on (i.e., the eco lamp being lit).

The eco lamp diag cumulative travel distance is a cumulative travel distance with a diagnosis function for determining use of the eco lamp being enabled.

In the example of FIG. 3, the numerator of the equation 2 is calculated by subtracting, from an eco lamp turned-on cumulative travel distance at the timing B, an eco lamp turned-on cumulative travel distance at the timing A. That is, in other words, the travel distance with the eco lamp turned on in the second evaluation section is calculated as the numerator.

The denominator of the equation 2 is calculated by subtracting, from a cumulative travel distance with the eco lamp turn-on diagnosis at the timing B, a cumulative travel distance with the eco lamp turn-on diagnosis at the timing A. That is, in other words, the cumulative travel distance with the eco lamp turn-on diagnosis exercisable in the second evaluation section is calculated as the denominator.

⟨ Mis-Geared Rate ⟩

The mis-geared rate is a rate of travel distance with a gear selection (i.e., a shift) not matching with an engine torque output.

The equation for calculating the mis-geared rate is, $$\text{(Mis-geared cumulative travel distance (n)} - \text{Mis-geared cumulative travel distance (n}-1))/(\text{Cumulative travel distance (n)}) - (\text{Cumulative travel distance (n}-1)) \quad \text{(Equation 3)}$$

The mis-geared cumulative travel distance is a cumulative travel distance of the vehicle with the gear selection mis-matching with the engine torque output.

In the example of FIG. 3, the numerator of the equation 3 is calculated by subtracting, from a mis-geared cumulative travel distance at the timing B, a mis-geared cumulative travel distance at the timing A. That is, in other words, the travel distance with the gear selection mis-matching with the engine torque output in the second evaluation section is calculated as the numerator.

The denominator of the equation 3 is calculated in the same manner as the equation 1.

⟨ Mode Selection Rate ⟩

The mode selection rate is a rate of travel distance with a travel mode of the vehicle set to a certain travel mode, such as a sport mode, a power mode and the like in a certain travel section or in a certain travel distance. In this case, the sport mode/power mode is a travel mode that prioritizes ease of driving, that is, the acceleration response and brake response are improved, for example. The sport/power travel mode may improve the acceleration rate.

The equation for calculating the mode selection rate is, $$\text{(Mode-selected cumulative travel distance (n)} - \text{Mode-selected cumulative travel distance (n}-1))/(\text{Cumulative travel distance (n)}) - (\text{Cumulative travel distance (n}-1)) \quad \text{(Equation 4)}$$

The mode-selected cumulative travel distance is, in this case, a cumulative travel distance of the vehicle with a selection of an eco mode that realizes an economical travel of the vehicle.

In the example of FIG. 3, the numerator of the equation 4 is calculated by subtracting, from an eco mode used (i.e., selected) cumulative travel distance at the timing B, an eco mode used (i.e., selected) cumulative travel distance at the timing A. That is, in other words, the travel distance with the eco mode selection in the second evaluation section is calculated as the numerator.

The denominator of the equation 4 is calculated in the same manner as the equation 1.

⟨ Over-Accel Rate ⟩

The over-accel rate is a rate of travel distance with an accelerator opening (a stepping amount of the accelerator) exceeding a threshold in a certain travel section or in a certain travel distance. The threshold of the acceleration is changed depending on the speed of the vehicle. The relationship of the acceleration with the vehicle speed is stored in a table format in the external memory 108, as illustrated in FIG. 5. That is, the threshold of the accelerator opening for each of the vehicle speeds of 0 km/h, 5 km/h, 10 km/h, 20 km/h, up to 110 km/h is defined in the table. Further, an engine type and transmission type attribute are added in the table.

The equation for calculating the over-accel rate is, $$\text{(Over-accelerated cumulative travel distance (n)} - \text{Over-accelerated cumulative travel distance (n}-1))/(\text{Cumulative travel distance (n)}) - (\text{Cumulative travel distance (n}-1)) \quad \text{(Equation 5)}$$

The over-accelerated cumulative travel distance is a cumulative travel distance of the vehicle with the accelerator opening exceeding a threshold.

In the example of FIG. 3, the numerator of the equation 5 is calculated by subtracting, from an over-accelerated cumulative travel distance at the timing B, an over-accelerated cumulative travel distance at the timing A. That is, in other words, the travel distance with the accelerator opening exceeding a threshold in the second evaluation section is calculated as the numerator.

The denominator of the equation 5 is calculated in the same manner as the equation 1.

Figure 6:
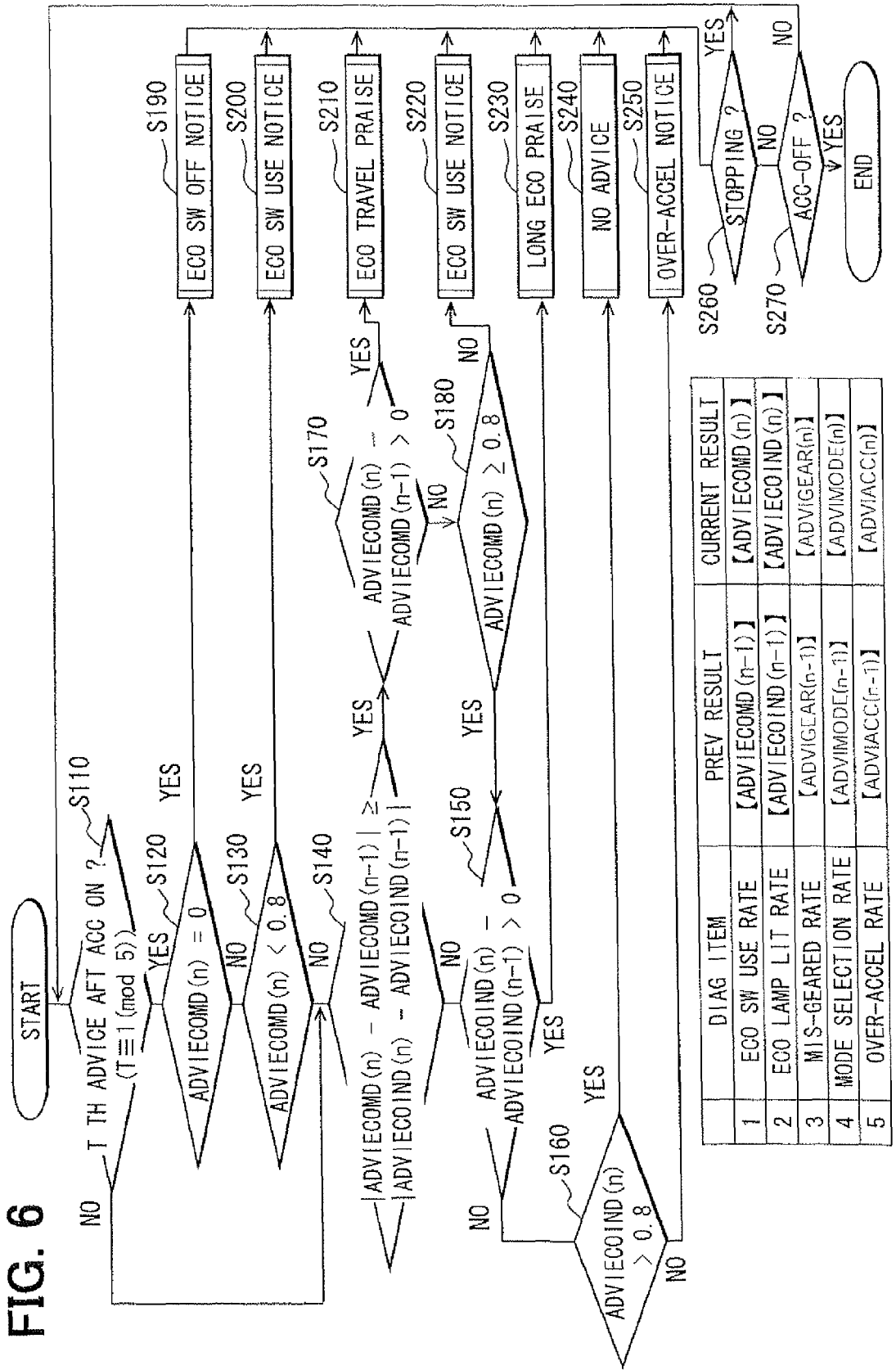
FIG. 6 is a flowchart of advice generation processing executed in a control circuit in the embodiment of the present disclosure.

A flowchart in FIG. 6 is then described for illustrating the advice generation processing in the control circuit 115.

The advice generation processing of FIG. 6 is executed at the advice generation timing as explained in FIG. 3.

At the start of the processing of FIG. 3, the process in S110 determines how many times the advice has been generated since turning-on of the accessory (ACC) switch (T th timing: 'T' is used as a variable), and then calculates the remainder of the number T after division by 5 (T/5). More practically, if the remainder is equal to 1 is determined.

The process proceeds to S140 when determining that the remainder of the division by 5 is not equal to 1 (S110:NO).

The process proceeds to S120 when determining that the remainder of the division by 5 is equal to 1 (S110:YES).

In other words, according to the above calculation, once for every five times of the advice generation processing, the process executes the processing of S120 and S130. By the above calculation in S110, the frequent execution of S120/S130 is prevented when the driver has intentionally turned off the eco switch. In other words, frequent/successive generation of an attention drawing advice, which may be generated depending on the determination in S120/S130, is prevented by the calculation of S110. Details of the operation scheme are described later.

In S120, the process proceeds to S190 when determining that the eco switch use rate in the current evaluation section is equal to 0 (S120:YES).

In S190, the process notifies that the eco switch is being turned off. More practically, an advice is generated for notifying that the eco switch is turned off, and the advice is displayed on the screen of the display unit 109. The advice may also be provided by voice from the voice I/O unit 110. The process then proceeds to S260.

In S120, if it is determined that the eco switch use rate in the current evaluation section is not equal to 0 (S120:NO), the process proceeds to S130.

In S130, the process determines whether the eco switch use rate in the current evaluation section is smaller than 0.8. If the eco switch use rate is smaller than 0.8 (S130:YES), the process proceeds to S200.

In S200, the process notifies that the eco switch use rate is low. More practically, an advice is generated for notifying that the eco switch use rate is low, and the advice is displayed on the screen of the display unit 109. The process then proceeds to S260.

If the eco switch use rate is not smaller than 0.8 (S130:NO), the process proceeds to S140.

In S140, an absolute value of difference between the eco switch use rate in the current diagnosis result and the eco switch use rate in the previous diagnosis result (designated as "eco switch diag value" hereinafter) is compared with an absolute value of difference between the eco lamp lit rate in the current diagnosis result and the eco lamp lit rate in the previous diagnosis result (designated as "eco lamp diag value" hereinafter). If the eco switch diag value is equal to or greater than the eco lamp diag value (S140:YES), the process proceeds to S170.

In S170, the process proceeds to S210 when determining that the eco switch use rate in the current evaluation section minus the eco switch use rate in the previous evaluation section is greater than 0 (S170:YES).

In S210, an "advice" that praises the driver for the economical driving condition is generated and displayed on the screen of the display unit 109. The process then proceeds to S260.

If, in S170, the difference is determined as not greater than 0 (S170:NO), the process proceeds to S180.

In S180, the process proceeds to S220 when determining that the eco switch use rate in the current diagnosis result is not equal to or greater than 0.8 (S180:NO), based on the reasoning that the eco switch use rate is low.

In S220, an advice that notifies the driver of a low eco switch use rate is generated and displayed on the screen of the display unit 109, and the process then proceeds to S260.

If, in S180, the process determines that the eco switch use rate is greater than 0.8 (S180:YES), the process proceeds to S150.

Further, if the process in S140 determines that the eco switch diag value is not equal to or greater than the eco lamp diag value (S140:NO), the process also proceeds to S150.

In S150, the process determines whether the eco lamp lit rate in the current evaluation section minus the eco lamp lit rate in the previous evaluation section is greater than 0. If the difference is greater than 0 (S150:YES), the process proceeds to S230.

In S230, an "advice" that praises the driver for a long eco lamp on period is generated and displayed on the screen of the display unit 109. The process then proceeds to S260.

If, in S150, the process determines that the difference is not greater than 0 (S150:NO), the process proceeds to S160. The process in S160 determines whether the eco lamp lit rate in the current diagnosis result is greater than 0.8. If the eco lamp lit rate in the current diagnosis result is greater than 0.8 (S160:YES), the process proceeds to S240. In S240, the process generates no advice before proceeding to S260.

If, in S160, the process determines that the eco lamp lit rate is not greater than 0.8 (S160:NO), the process proceeds to S250, for generating and displaying, on the screen of the display unit 109, an advice that notifies the driver that the accelerator is opened too much. The process then proceeds to S260.

In S260, the process returns to S110 when determining that the vehicle is stopping (S260:YES).

If, in S260, the process determines that the vehicle is not stopping (S260:NO), the process proceeds to S270.

In S270, the process returns to S110 when determining that the ACC switch is not turned off (S270:NO). If, in S270, the process determines that the ACC switch is turned off (S270:YES), the process concludes itself.

An example of the screen that displays the diagnosis result of the driving condition is shown in FIG. 7. The screen at least displays user information, an eco level, fuel mileage information, and an advice.

The user information is information of a user who is logged in. If no user is logged in, that is, if no user is identified, the screen displays GUEST DRIVER as the user name, indicating that the user is presumed as a guest.

The eco level is an index of the "economical" driving habit. For example, the diagnosis results such as the fuel mileage, the eco switch use rate, the eco lamp lit rate, the mis-geared rate, the mode selection rate, the over-accel rate and the like are totally evaluated, for the purpose of eco level determination. The term of evaluation may be for one minute, for one trip (e.g., a term between the turning-on and turning-off of the ACC switch), or for a period determined by the driver.

In the fuel mileage information, the fuel mileage at a certain time of travel is displayed.

In the advice column, an advice generated by the processing in FIG. 6 is displayed. More specifically, the advice generated in S190 to S230 and S250 is displayed.

As described above, the driving diagnosis system of the present embodiment can evaluate the driving condition and generate an advice for the driving condition in the current evaluation section, based on the comparison of the diagnosis result in the previous evaluation section and the diagnosis result in the current evaluation section, thereby enabling evaluation and provision of the advice on a diagnosis item that can hardly be evaluated in a quantitative manner. In other words, the relative assessment of the driving condition can be provided for the hardly diagnosed items that hardly accept the absolute assessment. Therefore, the driving skill of the driver can be effectively and efficiently improved.

Further, in the above embodiment, the excessive advice generation processing load as well as the discouragement of the driver can be prevented, due to the operation scheme in a well-sorted and considerate manner. That is, even when the diagnosis result in the current evaluation section has inferior contents relative to the previous evaluation section (S150:NO or S170:NO), an advice that warns the driver of the inferiority of the current condition is not generated (S240) when the current diagnosis result exceeds a certain standard (S160:YES or S180:YES). In other words, the deterioration of the driving condition does not directly lead to the warning advice.

Furthermore, in the above embodiment, an advice is generated for multiple diagnosis items separately (e.g., in S190 to S230 and S250), the contents of an advice can be more specific and concrete.

Furthermore, in the above embodiment, an advice is provided for the driver only when the vehicle is stopping, the driver can concentrate of the driving operation while the vehicle is traveling.

Further, the present disclosure may take a modified form described in the following.

Modification Example

Modification of the above-described embodiment is described with reference to FIG. 8.

Figure 8:
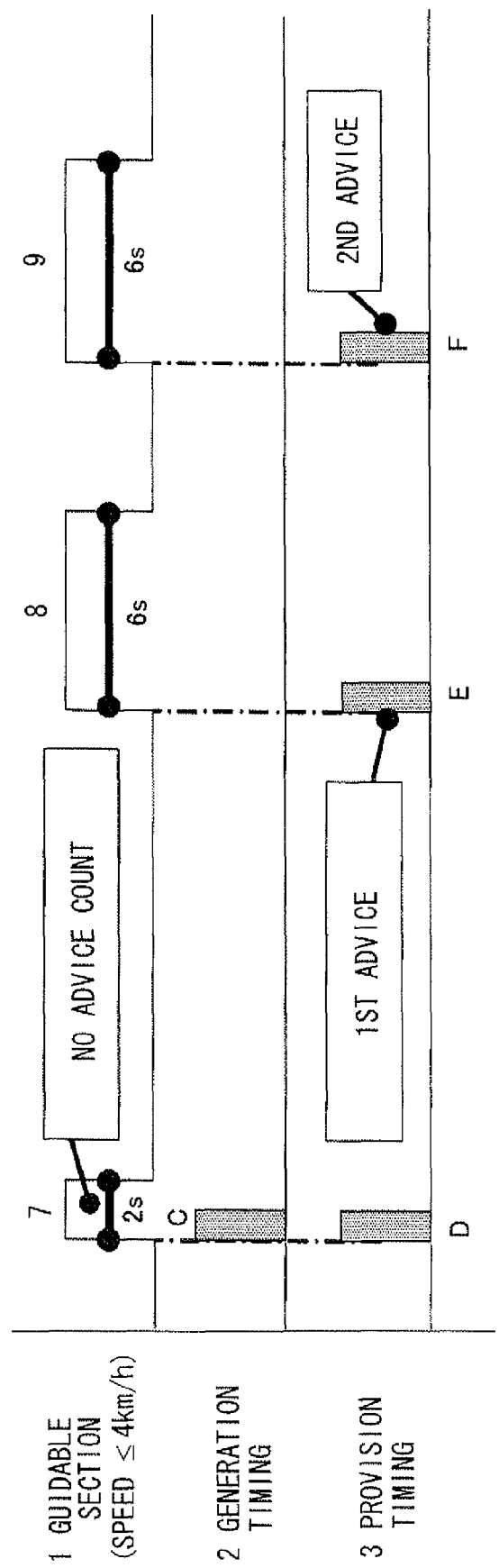
FIG. 8 is a time chart of advice provision timing in a modification example of the embodiment.

FIG. 8 is a time chart illustrating advice provision timing in the modification example.

The first row of the time chart is a travel condition of the vehicle, that is, a travel with a reduced speed and stopping of the vehicle subsequent to a stopping at a stop sign, for example, of an intersection.

In the first row, sections (7) to (9) represent reduced speed travel sections with the vehicle travel speed of 4 km/h or less, and the other portions represent stopping sections.

The second row of the time chart is advice generation timings. That is, a timing C indicates an advice generation timing. In the modification example, the advice is generated at a timing when the vehicle started a travel after stopping, that is, at a time of travel with the reduced speed.

The third row of the time chart is advice provision timings. That is, the advice is provided for the driver of the vehicle when the vehicle starts the travel after stopping, or after the travel with the reduced speed. In the modification example, the number of advice provision is twice.

The two counts of advice provision are determined in the following manner.

First, an advice is provided when the vehicle starts to travel, and is counted as the first advice after the travel with the speed above 0 km/h and under 4 km/h continues for at least 5 seconds.

For example, at a timing D in FIG. 8, that is, at a start point of the section (7), an advice is provided. However, the section (7) continues only for 2 sections that are less than 5 seconds, thereby not leading to the advice count.

Next, at a timing E at a start point of the section (8), another advice is provided with one advice count, due to the continuation of the section (8) for 6 seconds. That is, the advice provided at the timing E is considered as the first advice. Likewise, the advice provided at a timing F is considered as the second advice.

The above operation scheme has the following benefits and advantages. That is, the advice is provided at least twice, thereby preventing the driver from overlooking the provided advice.

Further, if the duration of stopping is less than 5 seconds, the advice count will not be incremented even when the advice is provided during stopping. Therefore, the advice count during, for example, the frequent goes and stops in a congested road section is not incremented by the advice provision due to a short stopping. That is, in other words, insufficiency of advice provision is prevented for the travel in a congested road section or the like.

Although the present disclosure has been fully described in connection with preferred embodiment thereof with reference to the accompanying drawings, it is to be noted that various changes and modifications will become apparent to those skilled in the art.

For example, for each of the multiple diagnosis items (see FIG. 4), an advice is provided in the above embodiment. Further, the advice generation and provision may be stopped, for a certain period of time, for the diagnosis item that does not have a "good" diagnosis for consecutive evaluation sections.

Furthermore, regarding the total evaluation of multiple diagnosis items (e.g., the eco-level in FIG. 7) based on the respective diagnosis items in FIG. 4 as described above, the respective diagnosis items may be weighted by a weighting factor.

Furthermore, the advice provision (i.e., notification of the advice) for the multiple diagnosis items in FIG. 4 may be performed in an order of weighting factors in the above embodiment.

Furthermore, the advice provision apparatus 10 or the driving diagnosis system 1 may only have the driving condition diagnosis functions without having the advice generation and provision functions.

Furthermore, the fuel consumption information in FIG. 7 may represent an average fuel consumption for a certain period of time, or may display a graph of fuel consumption trend for a certain period of time.

Such changes, modifications, and summarized scheme are to be understood as being within the scope of the present disclosure as defined by appended claims.

What is claimed is:

1. An advice provision apparatus comprising:
a vehicle information acquisition unit for acquiring vehicle information that represents a condition of a vehicle;
a diagnosis unit for diagnosing a driving condition of the vehicle for a travel section based on the vehicle information acquired by the vehicle information acquisition unit and for providing a diagnosis result for the travel section, the travel section being a unit of travel by the vehicle having a predetermined travel distance;
an advice generation unit for generating advice to be provided for a driver of the vehicle based on the diagnosis result provided by the diagnosis unit; and
an advice notification unit for notifying the driver of the advice generated by the advice generation unit, wherein
the diagnosis unit provides the diagnosis result for each travel section that satisfies the predetermined travel distance, and compares the diagnosis result of a subject travel section during a travel event with the diagnosis result of a previous travel section that was diagnosed before the subject travel section and occurred within the same travel event as the subject travel section, and
the advice generation unit generates the advice in regards to the diagnosis result of the subject vehicle when the diagnosis unit determines that the diagnosis result of the subject travel section is worse than the diagnosis result of the previous travel section,
wherein the travel event starts when an accessories (ACC) switch is turned on and ends when the ACC switch is turned off.

2. The advice provision apparatus of claim 1, wherein the diagnosis unit diagnoses multiple items of a driving condition and determines whether two of the multiple items have an individual diagnosis result of the subject travel section that is greater than a standard threshold when the diagnosis result of the subject travel is worse than the diagnosis result of the previous travel section, and
the advice generation unit does not generate the advice when the diagnosis result of the subject travel section is greater than the standard threshold.

3. The advice provision apparatus of claim 1, wherein
the diagnosis unit diagnoses multiple items of the driving condition, and the advice generation unit generates the advice on each of the multiple items based on the diagnosis result of each of the multiple items with the reservation that the advice for a specific item is not generated for a predetermined period if the specific item has deteriorated diagnosis results for consecutive travel sections.

4. The advice provision apparatus of claim 3, wherein each of the multiple items has a weighting factor, and
the driving condition of the target travel section is diagnosed based totally on the diagnosis results of the multiple items respectively weighted by the weighting factor.

5. The advice provision apparatus of claim 4, wherein the advice notification unit notifies the driver of the advice in an order based on weighting.

6. The advice provision apparatus of claim 1, wherein the advice notification unit notifies the driver of the advice when the vehicle is stopping.

7. The advice provision apparatus of claim 1, wherein the advice generation unit generates the advice when the vehicle is stopping.

8. A driving condition diagnosis apparatus comprising:
a vehicle information acquisition unit for acquiring vehicle information that represents a condition of a vehicle; and
a diagnosis unit for diagnosing a driving condition of the vehicle for a travel section based on the vehicle information acquired by the vehicle information acquisition unit, and for providing a diagnosis result for the travel section, the travel section being a unit of travel by the vehicle having a predetermined travel distance, wherein
the diagnosis unit provides the diagnosis result for each travel section that satisfies the predetermined travel distance, and compares the diagnosis result of a subject travel section during a travel event with the diagnosis result of a previous travel section that was diagnosed before the subject travel section and occurred within the same travel event as the subject travel section, to enable advice regarding the diagnosis result of the subject vehicle to be generated when the diagnosis unit determines that the diagnosis result of the subject travel section is worse than the diagnosis result of the previous travel section,
wherein the travel event starts when an accessories (ACC) switch is turned on and ends when the ACC switch is turned off.

9. A method for advice position, the method comprising:
acquiring vehicle information that represents a condition of a vehicle diagnosing a driving condition of the vehicle for a travel section based on the vehicle information acquired by an act of acquiring the vehicle information, and providing a diagnosis result for the travel section, the travel section being a unit of travel by the vehicle having a predetermined travel distance;
generating advice to be provided for a driver of the vehicle based on the diagnosis result; and
notifying the driver of the advice generated by an act of generating the advice, wherein
the act of diagnosing a driving condition further comprises providing a diagnosis result for each travel section that satisfies the predetermined travel distance, and comparing the diagnosis result of a subject travel section during a travel event with the diagnosis result of a previous travel section that was diagnosed before the subject travel section and occurred within the same travel event as the subject travel section, and
the act of generating advice further comprises generating the advice based on the diagnosis result of the subject vehicle when the diagnosis result of the subject travel section is worse than the diagnosis result of the previous travel section,
wherein the travel event starts when an accessories (ACC) switch is turned on and ends when the ACC switch is turned off.

10. A method for diagnosing a driving condition comprising:
acquiring vehicle information that represents a condition of a vehicle; and
diagnosing a driving condition of the vehicle for a travel section based on the vehicle information acquired by an act of acquiring the vehicle information, and providing a diagnosis result for the travel section, the travel section being a unit of travel by the vehicle having a predetermined travel distance, wherein
the act of diagnosing a driving condition further comprises providing a diagnosis result for each travel section that satisfies the predetermined travel distance, and comparing the diagnosis result of a subject travel section during a travel event with the diagnosis result of a previous travel section that was diagnosed before the subject travel section and occurred within the same travel event as the subject travel section, to enable advice regarding the diagnosis result of the subject vehicle to be generated when the diagnosis result of the subject travel section is worse than the diagnosis result of the previous travel section,
wherein the travel event starts when an accessories (ACC) switch is turned on and ends when the ACC switch is turned off.

* * * * *